(No Model.) 2 Sheets—Sheet 1.
W. W. BEAUMONT.
VARIABLE SPEED POWER CLUTCH.
No. 551,571. Patented Dec. 17, 1895.
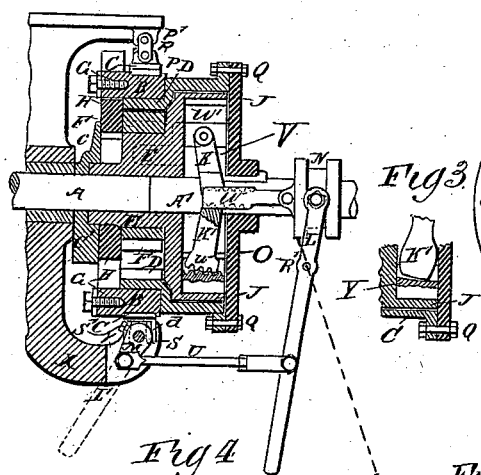
Fig 1.
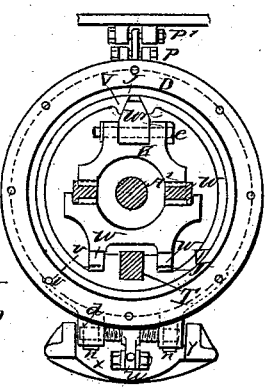
Fig 2.
Fig 3.
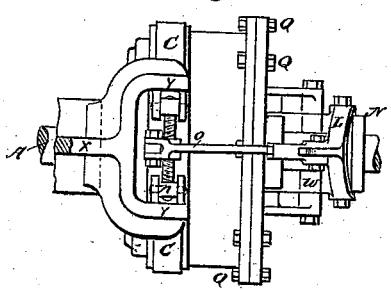
Fig 4.
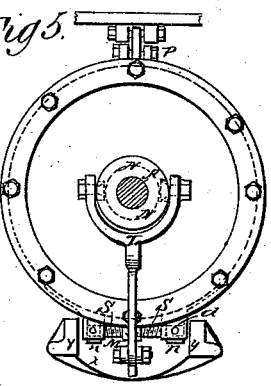
Fig 5.
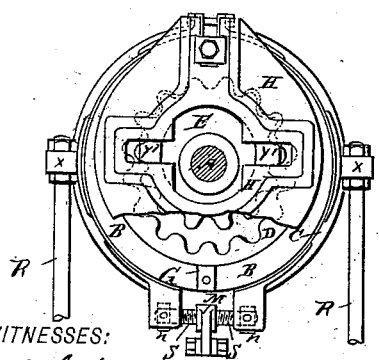
Fig 6.
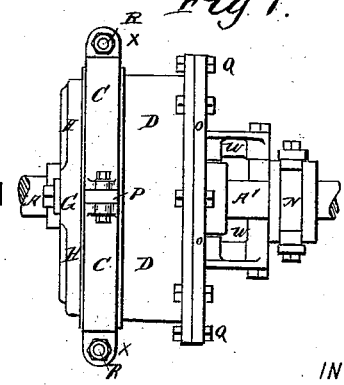
Fig 7.
WITNESSES:
Paul Jones
Theo. J. Hoster
INVENTOR
W. W. Beaumont
BY Munn & Co
ATTORNEYS.

(No Model.) 2 Sheets—Sheet 2.

W. W. BEAUMONT.
VARIABLE SPEED POWER CLUTCH.

No. 551,571. Patented Dec. 17, 1895.

WITNESSES:

INVENTOR
W. W. Beaumont
BY
ATTORNEYS.

UNITED STATES PATENT OFFICE.

WILLIAM WORBY BEAUMONT, OF LONDON, ENGLAND.

VARIABLE-SPEED POWER-CLUTCH.

SPECIFICATION forming part of Letters Patent No. 551,571, dated December 17, 1895.

Application filed April 20, 1895. Serial No. 546,503. (No model.) Patented in England January 11, 1893, No. 659, and February 27, 1894, No. 4,204.

*To all whom it may concern:*

Be it known that I, WILLIAM WORBY BEAUMONT, a subject of the Queen of Great Britain, residing in London, England, have invented certain new and useful Improvements in Variable-Speed Power-Clutches, (for which I have obtained Letters Patent in Great Britain, No. 659, dated January 11, 1893, and No. 4,204, dated February 27, 1894,) of which the following is a full, clear, and exact description.

The object of the invention is to provide a new and variable-speed power-clutch, by which driven shafting or adjacent parts of machinery may be so started that the inertia of rest is overcome at a slow speed by positive mechanism, the full speed of the driver being afterward obtained, there being two positive-gear speeds with optional intermediate speeds.

The invention consists principally of two successively-actuated clutches, of which one contains an epicycloidal gear by which it transmits power through the medium of part of the second clutch, the friction-grip surface of which is in part provided with an extension into it of part of or an attachment to the eccentric or shaft in the first clutch.

The invention also consists of certain parts and details and combinations of the same, as will be fully described hereinafter, and then pointed out in the claims.

Reference is to be had to the accompanying drawings, forming a part of this specification, in which similar letters of reference indicate corresponding parts in all the views.

Figure 8:
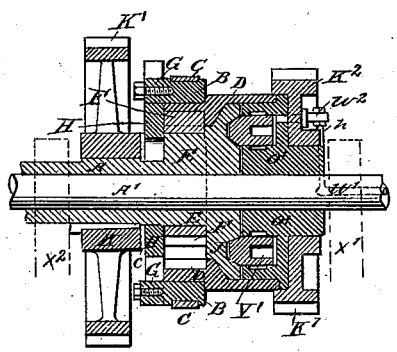
Figure 9:
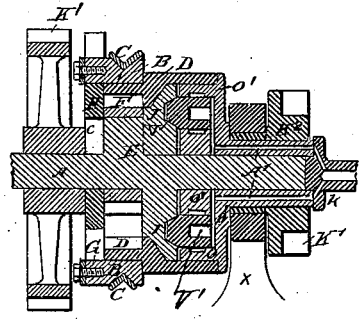
Figure 10:
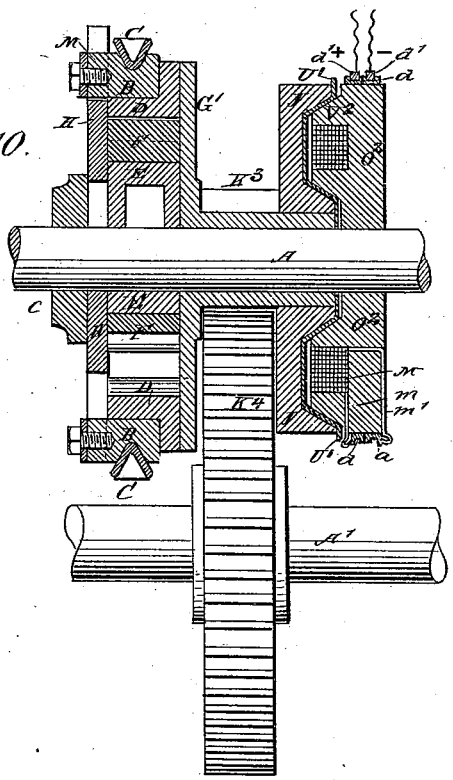

Figure 1 is a sectional side elevation of the improvement as arranged for line-shafting. Fig. 2 is an end elevation of the same with part in section and the cover of the container removed. Fig. 3 is a sectional side elevation of part of a modified form of friction-clutch. Fig. 4 is an inverted plan view of the improvement. Fig. 5 is an end elevation of the same. Fig. 6 is a face view of the epicycloidal gear and adjacent parts. Fig. 7 is a plan view of the same. Figs. 8 and 9 are sectional side elevations of modified forms of the improvement and arranged for driving shafting or adjacent parts of machinery, and Fig. 10 is a sectional side elevation of another modified form of the improvement.

With clutches and transmitters hitherto made it has always been necessary to put the driven shaft into motion at the speed of the driver, or to stop the driver and then make the connection, or by means of a friction-clutch to impart more or less gradually the speed of the driver to the driven. The latter is the more usual method, and it has serious disadvantages. First, it makes it necessary for the driving part of the clutch to attempt to put the driven into motion instantaneously, whatever the speed of the driver. This cannot be done without throwing very heavy stresses on driver and driven, and hence the friction-surfaces have to be rubbed together by the driving-power until the inertia of the driven is overcome by a more or less rapid repetition of alternating gripping and slipping, or by the gradually-increasing turning effort of the friction of one surface rubbing another, the work done in this process being always waste work, often throwing great stresses upon the machinery and always making a great demand on the source of power. This demand for power is attended with the disadvantage that very much more power than would otherwise be required, or can be usefully employed, must be provided, although it is only required for the few seconds occasionally occupied in starting the driven machinery. There is the further disadvantage that clutches, as ordinarily made for the purposes referred to, must have great strength and provision for the wear which results from the rubbing of the driver until the driven has acquired full speed. These several losses and disadvantages I avoid by combining two clutches with interrelated positive gearing, by means of which a mechanical advantage or leverage is secured and acts by starting the driven shaft at a low speed—as, for instance, one-fourth that of the driver—with slip, or only with that which relates to imparting motion below this low-speed ratio. Having overcome the inertia and friction of rest the second part of the combination imparts the full speed of the driver, with only the small amount of slip that may be desirable as variable intermediate frictionally-conveyed speed in increasing the speed of the already moving driving-shaft to the full speed of the driven. By thus starting driven machinery by positive gear at low speed—say one-fourth that of the driven—it becomes possible to work, say, a mill, in which a part is occasionally laid off, or machinery or vehicles operated by electric motors, with only a very slight excess of power over that employed for running such mill machinery or electric-motor vehicle when in motion, whereas from twenty-five to one hundred per cent. excess over such an amount of power is now employed. The variable-speed gearing combined clutch herein described is so arranged that when the driven is rotating at the speed of the driver, all the parts of the combination which convey the power are rotating without any relative motion or as though one solid piece.

I am aware that different speeds are at present conveyed by a driving-shaft to a driven, by means of two clutches and two sets of wheels, or wheels and pinions on the two shafts; but any such arrangement is accompanied by the objection that one or other or both of one pair of the wheels, or the wheel and pinion not doing work run idle, either at the higher speed or with the difference of speed between the driver and the driven; but such arrangements are not applicable for variable-speed gearing operating two coaxial shafts.

In Fig. 1 of the drawings hereof, A is a driving shaft or spindle, and A' a driven spindle, to which it is desired to communicate motion at the speed of the driving-shaft A, and in such a manner that the inertia of rest of the shaft A', and of that which may be connected to it, is overcome at the slow speed proper to the ratio of the internally-geared ring D and the externally-geared ring F, which is carried by the eccentric E, fixed upon the driving-shaft A. Upon the ring F are two lugs Y', (shown in Fig. 6,) and fitted to slide in slots in the disk H, and when the latter is not permitted to rotate, but itself slides upon the lugs G on the ring B, the ring F under the action of the eccentric E receives a gyratory motion, the range of which is twice the eccentricity of the eccentric E. To prevent the rotation of the ring B, and thereby of the lugs G and the disk or part H, the band clutch-ring C is closed upon it by means hereinafter described. The ring D is then by the action of the eccentric E and toothed ring F caused to rotate as before mentioned, and by its connection with the disk or cover O keyed to the driven shaft A' it communicates motion to the latter at a speed which is, for instance, one-fourth that of A. Having by these means overcome the friction and inertia of rest of A' and anything it drives, the band clutch-ring C is released and the second clutch formed by the parts W W' K J V brought into action by expanding the ring V into the container-ring J, which is an extension of the eccentric E of the first-mentioned clutch and gear. The extension J of the eccentric E may be formed with the eccentric, or may be a separately-formed extension fastened to it, or the shaft A. The ring V is driven by the lug T, which is formed upon or connected to the cover or disk O. The ring V being expanded into the container J is driven by it, and by the lug T and cover O it drives at its own speed the shaft A', and the whole of the parts F D B H being free to turn with the container J are carried with it, and as the ring V cannot rotate without moving the lug T the cover O is driven by it, and thereby the shaft A'.

To put the epicycloidal gear part of the combination into action so as to start the shaft A' at the speed proper to the ratio of the epicycloidal gear, the ring B is held by the band clutch-ring C, and this in the arrangement shown in Figs. 1, 2, 4, 5, 6 and 7 is effected by means of the right and left handed screw S and pivoted nuts N N, held between ears or lugs $d$, attached to the band clutch-ring C, the screw S being of quick pitch, and receiving partial rotation by means of the lever M fixed thereon by a set-screw S'. The lever M may be operated by the rod U, which is adjustable as to length, and is connected to the lever L, or it may be extended, as indicated by dotted lines, forming a lever L', by which the screw S may be separately actuated. The shafting-bracket X is extended into the fork formed by parts Y Y, which act as stops to prevent the rotation of the band-clutch ring C when tightened upon the ring B. The band-clutch ring may be in one piece or may be made, as shown, in two parts, with ears or lugs at the upper ends connected by the bolt P, which further serves as a suspending-bolt by means of the link R carried by the bolt $p'$ in lugs which may be upon the upper part of the shafting-bracket. The wear of the screw S, nuts N, and band-clutch ring C may be taken up by shifting the lever M by the screw S' or by screwing up the bolt P. By moving the lever M away from the bracket X and unscrewing the right and left hand screw S, so as to release the band-clutch ring C, the ring B is permitted to rotate and the clutch is out of gear. The ring F may then rotate idly upon the eccentric E, or it may rotate and gyrate according to the freedom or ease with which the parts move upon each other. To balance the eccentric E and the unbalanced weight due to the eccentricity of the disk H, a disk C, made heavy in the part C' opposite the greatest radius of the eccentric, is employed, the same disk serving to keep the disk H in its place. The eccentric E may also be lightened by cutting out the part marked in dotted lines in Fig. 1.

When the shafts A and A' are not running at the same speed the driven shaft A' rotates in the eccentric, which may be bushed as far as the shaft enters it.

By the means so far described the shaft A' is started and may be kept running at the speed due to the epicycloidal gearing. To increase the speed, and to bring it up to that of A, the band-clutch ring C is released, as described, and by means of the lever L pivoted at R' the collar N is pushed toward the cover O, and thereby the toothed wedge-pieces are forced between the toggle-pieces K K', and the distance apart of their outer extremities thus increased. By this means the wedge W', Figs. 1 and 2, is forced between the ends of the ring V, (see Fig. 2,) thus expanding it and causing it to fit the container J tightly and by it to be carried round. Being thus carried round, the ring V carries the lug T, and thereby the cover O and shaft A', as before explained. The lower ends of the toggle-piece K' may be toothed where they rest and roll on the thickened part of the ring V, as shown in Figs. 1 and 2, or they may have a smooth curved end, as shown at Fig. 3, rolling on a curved or flat surface. The wedge-pieces W W slide through holes in the cover O, and the collar N slides on the shaft A', and is kept in place by a feather in the ordinary way. The lever L may be coupled to the lever M by a rod U, as shown, adjustable as to length, and the combined clutches operated by the one lever L or by a lever L'. As shown in Fig. 1 the epicycloidal gear part of the combination is in action. By throwing the lever L over to the position shown by the dotted line this friction full-speed clutch is put into gear, the clutch taking up the work more or less rapidly, according to the rapidity with which the ring V is expanded into its container J.

The combination shown in Figs. 6 and 7 is the same as that described with reference to Figs. 1 to 5, except that the clutch band-ring C is held by means of rods R, which take hold of ears X, and are assumed to be connected at their other ends to any suitable available parts of adjacent machine-frames or structure.

In Fig. 1 the toothed pieces W are shown as tapered or wedge form; but these pieces may be parallel, and the toggle K and K', instead of having as a curve for the teeth which roll on W a pitch-line, which is concentric with a point in the middle of the end W in K' or the pivot $e$ in K, may have a curved pitch-line of similar radius, but struck from a point some distance from the points named, so that the pieces K and K' may act as cams or rolling wedges; or if the pieces W be made of wedge form, the pitch-lines of the teeth may be curves which join parallel tangent lines at two-thirds the distance from the point of the wedge to the end of the teeth, thus giving the wedge a quick action at the point, and slower action as it is pushed farther in.

It will be understood that although I have particularly described the friction-clutch containing the parts J K W' V as one of the two clutches, I do not confine myself to this particular form of friction-clutch, as other well-known radial action clutches may be employed.

Figs. 8 and 9 show the arrangement of the combined clutches when one of them is worked by fluid-pressure. By extending the eccentric E, or attaching to it a disk which extends into and forms part of the second clutch, and by giving to the back of this extension the form shown, I secure a simpler friction-surface, and am enabled to dispense with a loose ring, intervening between the annular piston and the friction-surface and which would otherwise be necessary.

Fig. 8 shows the arrangement when the driving-shaft A is hollow and runs upon the driven shaft A'. The action of the band-clutch and epicycloidal gear part of the combination is as already described with reference to Figs. 1 to 7. Air, gas or oil or other liquid is sent through the passage $w'$ in the driven shaft admitted by a pipe fitted with a rotative stuffing-box, and from the passage $w'$ passes into a pipe $p$, which is capped, and admits it through the fixture $W^2$ into the annular cylinder O', which is fixed to the driven shaft A', where it acts against the annular piston V', made fluid-tight by cup-leathers. The driving-shaft A may run in a bearing $X^2$, and may be the shaft of a motor, or it may be cut off close to the wheel K', by which it may be driven, and the shaft A may carry the driven shaft as the bearing $X^2$ does at the other end. The power to be transmitted may be taken from a wheel $K^2$ inside the bearing X', or from wheels or pulleys from the shaft outside this bearing.

Fig. 9 shows a modification of the arrangement of the combined clutches for working with a fluid-pressure friction-clutch when the driving-shaft A runs within a hollow driven shaft A' through passages W' W', in the thickness of which the fluid under pressure is sent from the pipe $W^2$ and ported flange into the annular cylinder O', where it acts on the piston V'. The driving and driven shafts in Fig. 9 may be made as shown in Fig. 1; but as shown in Fig. 9 the power is transmitted through a gear wheel or pulley $K^2$ on the hollow shaft A', which runs in a bearing X between it and the disk O, forming the annular cylinder. The wheel $K^2$ may be placed within the bearing, as in Fig. 8.

Fig. 10 shows a modification of the combination of power-gear clutches hereinbefore described, by means of which the friction-surfaces of one of the clutches are operated by an electromagnet. The part of the combined clutch containing the epicycloidal gear is the same as hereinbefore described; but the disk J is separated from it by the width of the pinion $K^3$, upon the extended boss of which it is fixed, but upon which it is free to move a little in the axial direction. The disk $O^2$ is made of sufficient thickness to allow of the formation in it of the annular channel, in which is placed a coil M of insulated copper wire, the ends $m$ $m'$ of the coil being connected to collector-rings. (Seen in section at $d$ $d$.) Electric current is conveyed to and away from the collector-rings $d$ by means of the brushes $d'$ $d'$ through the positive and negative wires and —, and thus the coil M receives current while the clutch is rotating and converts the disk $O^2$ with its friction-faces V into an electromagnet in the way generally understood. When it is necessary therefore that the pinion $K^3$ should be driven at the speed of the motor-shaft A, a current is sent into this coil and the disk J is magnetically and frictionally held to the disk $O^2$ by the faces $V^2$. An intervening corrugated disk $U'$ of the shape of the friction-surfaces is placed between the disks J and $O^2$, so that remanent magnetism shall not prevent the immediate separation of J and $O^2$ when the current is switched out. The disk, dish, or plate $U'$ may be of steel or iron, or of a suitable non-magnetic metal. When the electromagnet is not energized and the clutch E F D B C is used, the driven wheel $K^4$ on the driven shaft $A'$ is rotated at the slow speed corresponding to the speed of the epicycloidal gear E F D multiplied by the ratio of the pinion $K^3$ and wheel $K^4$, which, as shown in the drawings, are about five and four respectively, so that the speed of the shaft $A'$ would be one-twentieth that of A.

I do not claim the use of two clutches, which with connected exterior gearing and the means of putting one or the other set of gear into action, may be used to impart one or other speed to adjacent or parallel shafts or spindles.

Having thus described my invention, I claim as new and desire to secure by Letters Patent—

1. A variable speed power clutch, comprising two successively actuated clutches, one of the clutches containing an epicycloidal gear by which it transmits power through the medium of part of the second clutch, the friction grip surface of which is in part provided with an extension into it of part of or an attachment to the eccentric or shaft in the first clutch, substantially as shown and described.

2. In a variable speed power clutch, the combination with an epicycloidal gear, of two friction clutches, one of which is directly connected to the epicycloidal gear, and the other has an operative engagement with a part held to rotate with the shaft of the first clutch and means for successively operating the same, substantially as shown and described.

3. In a variable speed power clutch, the combination with an epicycloidal gear, of two inter-related co-axial friction clutches, one of which is directly connected to the epicycloidal gear, and the other has an operative engagement with a part held to rotate with the shaft of the first clutch, and means for operating the same, substantially as shown and described.

4. A variable speed power clutch, comprising two inter-related co-axial friction clutches, and an epicycloidal gear forming part of both clutches, one of which is directly connected to the epicycloidal gear, and the other has an operative engagement with a part held to rotate with the shaft of the first clutch, substantially as shown and described.

5. A variable speed power clutch, comprising two inter-related co-axial clutches, an epicycloidal gear directly connected to one of the clutches, and provided with an eccentric, and friction driving surfaces forming the second clutch, one of said surfaces being held to rotate with the said eccentric, substantially as shown and described.

6. In a variable speed power gear clutch, the combination with an epicycloidal gear having one part directly connected to the driven shaft to rotate therewith, another part capable of either a rolling or a driving engagement with the said first part, and an eccentric, secured to the driving shaft, for imparting a gyrating motion to said second part, of friction driving surfaces for the said eccentric, connected to the driven shaft, substantially as shown and described.

7. A variable speed power clutch, comprising a gear wheel held to rotate with the driven shaft, another gear wheel operatively connected to the driving shaft and capable of a rolling movement on the first-named gear wheel, and means for preventing the rolling movement of the second gear wheel, to drive the first-named gear wheel, substantially as described.

WILLIAM WORBY BEAUMONT.

Witnesses:
W. M. HARRIS,
T. F. BARNES.